(12) United States Patent
Ishii

(10) Patent No.: US 7,280,284 B2
(45) Date of Patent: Oct. 9, 2007

(54) ZOOM LENS

(75) Inventor: Atsujiro Ishii, Nishi-tokyo (JP)

(73) Assignee: Olympus Corporation, Tokyo (JP)

( * ) Notice: Subject to any disclaimer, the term of this patent is extended or adjusted under 35 U.S.C. 154(b) by 77 days.

(21) Appl. No.: 11/219,781

(22) Filed: Sep. 7, 2005

(65) Prior Publication Data

US 2006/0050406 A1   Mar. 9, 2006

(30) Foreign Application Priority Data

Sep. 7, 2004   (JP) .............................. 2004-259416

(51) Int. Cl.
    G02B 15/14   (2006.01)
(52) U.S. Cl. ..................................... 359/680; 359/691
(58) Field of Classification Search ........ 359/680–682, 359/691

See application file for complete search history.

(56) References Cited

U.S. PATENT DOCUMENTS 3,737,214 A * 6/1973 Shimizu ..................... 359/749
3,832,035 A * 8/1974 Takahashi ................... 359/708
6,982,834 B2 * 1/2006 Sato ........................... 359/682

FOREIGN PATENT DOCUMENTS

| JP | 07-261082 | 10/1995 |
| JP | 2000-221399 | 8/2000 |
| JP | 2002-287031 | 10/2002 |

* cited by examiner

*Primary Examiner*—Ricky L Mack
*Assistant Examiner*—M. Hasan
(74) *Attorney, Agent, or Firm*—Kenyon & Kenyon LLP

(57) ABSTRACT

A zoom lens comprises, in order from an object side to an image side, a lens group having negative refracting power, and a lens group having positive refracting power. Zooming is carried out with a change in a space between at least said two lens groups. The lens group having negative refracting power comprises a plurality of aspheric surfaces. The lens group having positive refracting power comprises at least one aspheric surface. The lens group having negative refracting power comprises at least three negative lenses, with satisfaction of the following condition: $2.3 < |f_2/f_1| < 3.1$, where $f_1$ is a focal length of said lens group having negative refracting power, and $f_2$ is a focal length of said lens group having positive refracting power.

15 Claims, 9 Drawing Sheets

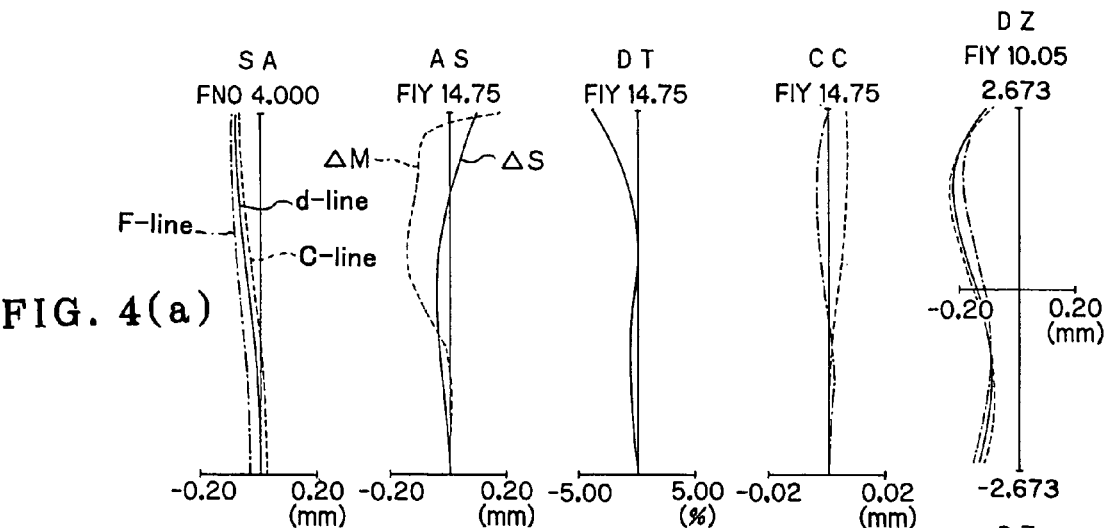
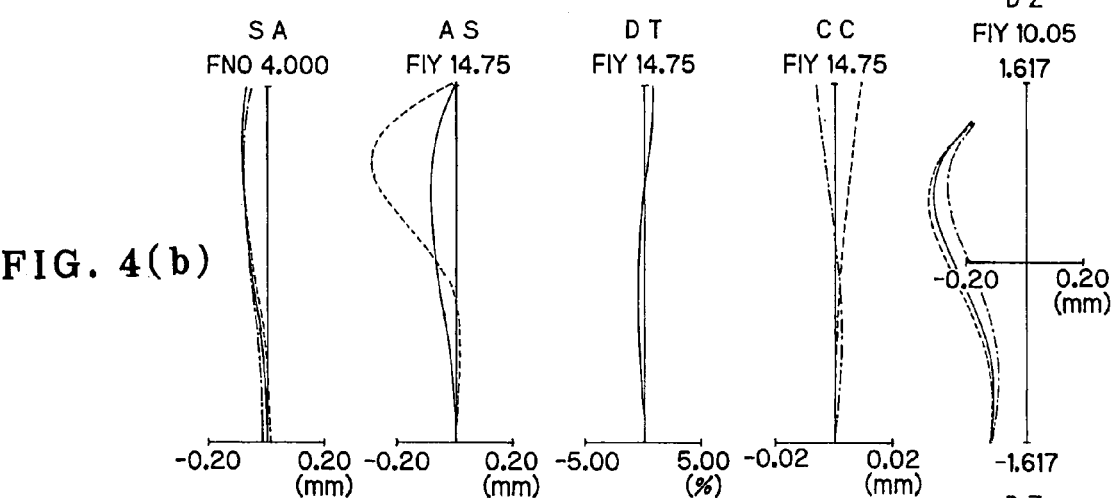
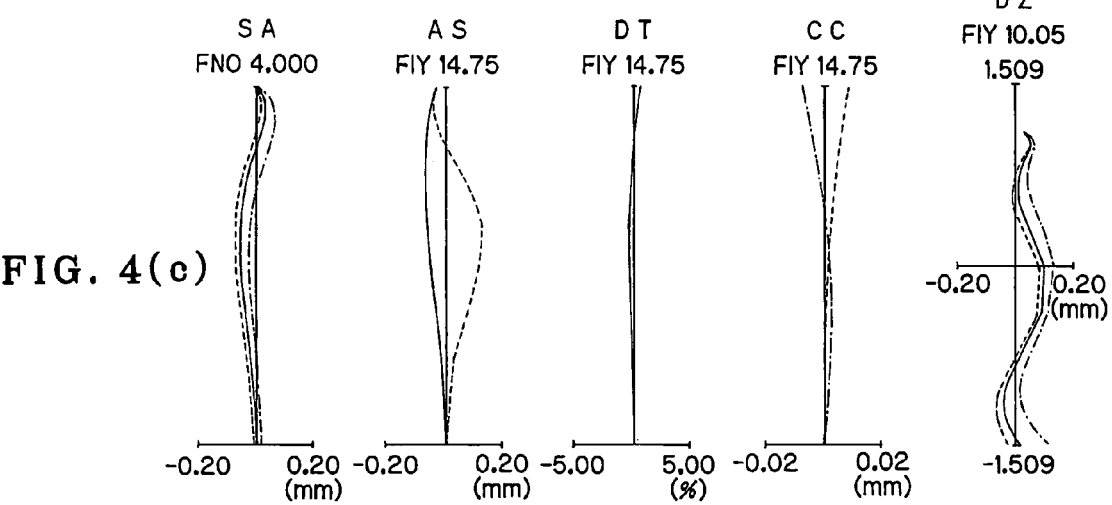

ZOOM LENS

This application claims benefit of Japanese Application No. 2004-259416 filed in Japan on 9.7, 2004, the contents of which are incorporated by this reference.

BACKGROUND OF THE INVENTION

The present invention relates generally to a zoom lens, and more particularly to a wide-angle zoom lens adapted for use with single-lens reflex cameras for which increased back focuses are needed.

In recent years, camera systems using an image pickup device smaller in image circle than prior art silver halide 35-mm film have been developed in the form of digital single-lens reflex cameras. The objective of these systems is to diminish image pickup device size, thereby providing a smaller, relatively inexpensive single-lens reflex camera.

Even with an image pickup device of smaller size, however, it is still difficult to diminish the size of a shutter unit or the like congruously. Because an optical low-pass filter or the like unnecessary for silver halide single-lens reflex cameras must be located in front of the image pickup device, it is also still difficult to diminish the back focus necessary for interchangeable lenses at a similar ratio at which image pickup device size is more reduced than 35-mm system size. Accordingly, these interchangeable lenses must have a larger back focus than the focal length of those for the 35-mm system. Especially with a wide-angle lens having a short focal length, there is a problem that it is very difficult to ensure the necessary back focus.

So far, such systems as set forth in patent publications 1, 2 and 3 have been known as a superwide-angle zoom lens like one having an angle of view of greater than 100° at the wide-angle end.

However, they have only a back focus for prior art silver halide 35-mm film systems, and so it is difficult to apply them immediately to digital single-lens reflex cameras which incorporate an image pickup device of such smaller size as mentioned above and must have a back focus at a larger ratio relative to focal length.

Patent Publication 1
JP(A)7-261082
Patent Publication 2
JP(A)2000-221399
Patent Publication 3
JP (A) 2002-287031

SUMMARY OF THE INVENTION

In view of such problems with the prior art as briefed above, the object of the invention is to provide a wide-angle zoom lens adapted for use with a single-lens reflex camera incorporating an image pickup device for which an increased back focus is required.

According to the first aspect of the invention, there is provided a zoom lens, comprising, in order from an object side to an image side thereof, a lens group having negative refracting power, and
a lens group having positive refracting power, wherein:
zooming is carried out with a change in the space between at least said two lens groups,
said lens group having negative refracting power comprises a plurality of aspheric surfaces,
said lens group having positive refracting power comprises at least one aspheric surface, and
said lens group having negative refracting power comprises at least three negative lenses, with satisfaction of condition (1):

$$2.3 \leq |f_2/f_1| \leq 3.1 \tag{1}$$

where $f_1$ is the focal length of said lens group having negative refracting power, and $f_2$ is the focal length of said lens group having positive refracting power.

According to the second aspect of the invention, there is provided a zoom lens, comprising, in order from an object side to an image side thereof, a lens group having negative refracting power, and
a lens group having positive refracting power, wherein:
zooming is carried out with a change in the space between at least said two lens groups, and
said lens group having negative refracting power comprises, in order from an object side thereof,
a first lens L1 that has negative refracting power and is in a meniscus form having a convex surface on its object side,
a second Lens L2 that is in a meniscus form having a convex surface on its object side,
a third lens L3 that has negative refracting power and is in a meniscus form having a convex surface on its object side,
a fourth lens L4 that has negative refracting power and a concave surface on its object side,
a fifth lens L5 having positive refracting power, and
a negative lens located on an image side of the zoom lens with respect to said fifth lens L5.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4(a), 4(b) and 4(c) are aberration diagrams for the zoom lens of Example 1 upon focusing on an infinite object point.

DESCRIPTION OF THE PREFERRED EMBODIMETNS

Figure 1A:
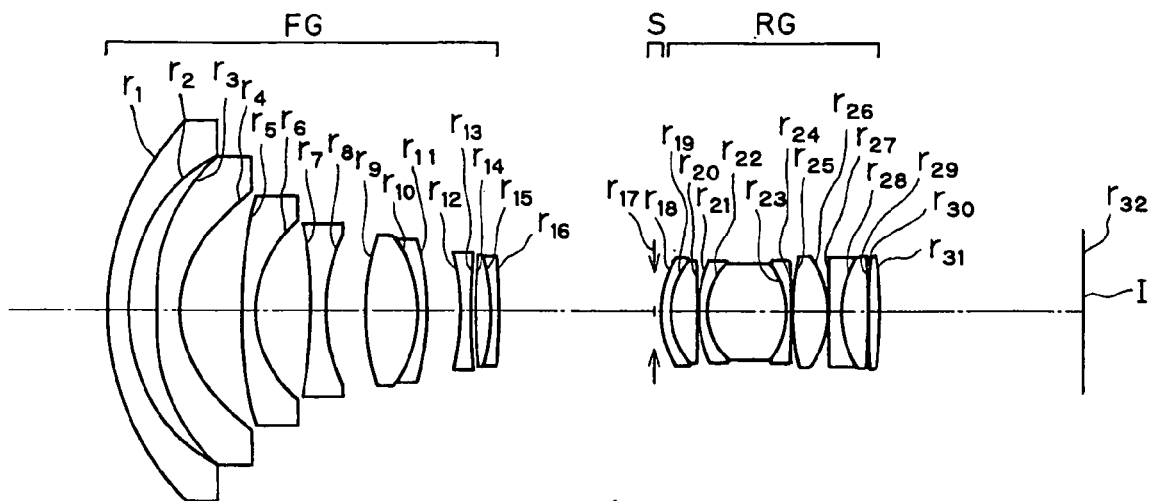
FIGS. 1(a), 1(b) and 1(c) are illustrative in lens arrangement section of Example 1 of the zoom lens according to the invention at the wide-angle end (a), in an intermediate setting (b) and at the telephoto end (c), respectively, upon focusing on an infinite object point.

Possible arrangements of the zoom lens according to the invention will first be explained, and their embodiments will then be described.

The first zoom lens of the invention comprises, in order from its object side, a lens group having negative refracting power and a lens group having positive refracting power with the space between at least said two lenses changing for zooming, wherein:

said lens group having negative refracting power comprises a plurality of aspheric surfaces therein, said lens group having positive refracting power comprises at least one aspheric surface therein, and said lens group having negative refracting power comprises at least three negative lenses, with satisfaction of condition (1):

$$2.3 \leq |f_2/f_1| \leq 3.1 \quad (1)$$

where $f_1$ is the focal length of said lens group having negative refracting power, and $f_2$ is the focal length of said lens group having positive refracting power.

The advantage of, and the requirement for, the first zoom lens set up as recited above is now explained.

Generally, the so-called retrofocus type with a negative lens group and a positive lens group located in order from its object side is used as a wide-angle lens for single-lens reflex cameras for which an increased back focus is needed. For this type lens system to ensure a longer back focus relative to its focal length, the focal length of the positive lens group must be increased. However, increasing the focal length of the positive lens group leads inevitably to an increased space between the positive lens group and the negative lens group. This in turn causes the total length of the lens system to become long, and the position of off-axis rays passing through the negative lens group to become high, resulting in an increase in the diameter of the front lens in the negative lens group. At the same time, there arises a problem that distortion and astigmatism likely to occur with a wide-angle lens increase drastically.

To solve these problems, the invention uses at least two aspheric surfaces in the negative lens group, at least one aspheric surface in the positive lens group, and at least three negative lenses in the negative lens group, thereby making correction of negative distortion and astigmatism susceptible to occur at the negative lens group.

Condition (1) defines the ratio of the focal length of the positive lens group to that of the negative lens group. As the focal length of the second (positive) lens group becomes smaller than the lower limit of 2.3, it is difficult to ensure the necessary back focus as already mentioned. As the focal length of the second lens group is larger than the upper limit of 3.1, the total length of the lens system and the diameter of the front lens increase, and off-axis aberrations become too noticeable to correct.

The lower limit to condition (1) could be set at 2.35 and the upper limit at 3.0 or, preferably, 2.8.

The second zoom lens of the invention comprises, in order from its object side, a lens group having negative refracting power and a lens group having positive refracting power with the space between at least said two lens groups changing for zooming, characterized in that:

said lens group having negative refracting power comprises, in order from its object side, a first lens L1 that has negative refracting power and is in a meniscus lens having a convex surface on its object side, a second lens L2 that is in a meniscus form having a convex surface on its object side, a third lens L3 that has negative refracting power and is in a meniscus form having a convex surface on its object side, a fourth lens L4 that has negative refracting power and a concave surface on its object side, a fifth lens L5 that has positive refracting power, and at least one negative lens located on an image side of the fifth lens L5.

The advantage of, and the requirement for, the second zoom lens set up as recited above is now explained.

Generally, the so-called retrofocus type with a negative lens group and a positive lens group located in order from its object side is used as a wide-angle lens for single-lens reflex cameras for which an increased back focus is needed. For this type lens system to ensure a longer back focus relative to its focal length, the focal length of the positive lens group must be increased. However, increasing the focal length of the positive lens group leads inevitably to an increased spacing between the positive lens group and the negative lens group. This in turn causes the total length of the lens system to become long, and the position of off-axis rays passing through the negative lens group to become high, resulting in an increase in the diameter of the front lens in the negative lens group. At the same time, there arises a problem that distortion and astigmatism likely to occur with a wide-angle lens increase drastically.

To solve these problems, the lens group of negative refracting power in the invention uses three lenses, that is, the first lens L1 that has negative refracting power and is in a meniscus form having a convex surface on its object side, the second lens L2 that is in a meniscus form having a convex surface on its object side and the third lens L3 that has negative refracting power and is in a meniscus form having a convex surface on its object side, thereby making correction for negative distortion and astigmatism susceptible to occur at the negative lens group.

Further in the invention, especially higher-order aberrations produced at the first L1 to the third lens L3 are corrected at the negative lens L4 concave on its object side and the positive lens L5.

Furthermore in the invention, the negative lens is located on the image side of the positive lens L5 to offer a balance between chromatic aberration of magnification and longitudinal chromatic aberration and place axial aberrations in order. Throughout zooming, these cooperate with correction of aberrations at the lens group on the image side of the lens group having negative refracting power, thereby achieving an arrangement of high image-formation capability.

If an aspheric surface is used, the image-formation capability could then be much more improved.

Preferably in this case, the lens group having negative refracting power comprises a plurality of aspheric surfaces therein and the lens group having positive refracting power comprises at least one aspheric surface therein.

Especially if the negative lens located on the image side of the lens L5 having negative refracting power is cemented to another positive lens to form a cemented lens, performance degradation by decentration and higher-order aberrations could then be controlled.

Further, the use of a lens of negative refracting power for the second lens L2 works for correction of aberrations of a wide-angle arrangement, because the first, the second and the third lens are all in negative meniscus forms.

For the arrangement of the first or second zoom lens, it is further preferable to satisfy condition (2).

$$2.0 \leq |f_{2A}/f_1| \leq 3.5 \quad (2)$$

where $f_{2A}$ is the focal length of a combined system on the image side of the zoom lens with respect to the lens group having negative refracting power at the wide-angle end, and $f_1$ is the focal length of the lens group having negative refracting power.

As the combined focal length of the second lens group (having positive refracting power) and the following lens group is smaller than the lower limit of 2.0 to condition (2), it is difficult to ensure the necessary back focus as already mentioned. As the combined focal length of the second lens group and the following lens group is longer than the upper limit of 3.5, the total length of the lens system and the diameter of the front lens increase and off-axis aberrations become too noticeable to correct, again as already discussed.

The lower limit to condition (2) could be set at 2.3 and the upper limit at 3.2 or, preferably, 3.0.

For the second zoom lens plus condition (2), it is further desired to satisfy condition (3) upon focusing an infinite object point at the wide-angle end.

$$0 \leq |d4/d1| \leq 3 \quad (3)$$

where d1 is the space between said first lens L1 and said second lens L2, and d4 is the space between said fourth lens L4 and said fifth lens L5.

Falling short of the lower limit of 0 to condition (3) renders it impossible to obtain any lens arrangement, and exceeding the upper limit of 3 is not preferable, because especially axial higher-order aberrations become more noticeable and principal point positions especially at the telephoto end are far away from the image plane.

Setting the upper limit at 0.3, especially 0.1 is preferable because the total length becomes short.

Further in the invention, it is desired that at least one negative lens in the lens group having negative refracting power and at least one positive lens in the lens group having positive refracting power be each formed of a glass material that satisfies condition (4).

$$\theta_{g,F} \geq -0.0016 \times v_d + 0.65 \quad (4)$$

where $\theta_{g,F} = (n_g - n_F)/(n_F - n_C)$
$v_d = (n_d - 1)/(n_F - n_C)$
$n_g$ is a g-line refractive index,
$n_F$ is an F-line refractive index,
$n_d$ is a d-line refractive index, and
$n_C$ is a C-line refractive index.

Referring generally to the retrofocus type superwide-angle zoom lens like the inventive one, an aperture stop is placed between a negative lens group and a positive lens group and near either one of them. With this arrangement, some noticeable chromatic aberration of magnification is likely to occur, and it is difficult to minimize the so-called secondary chromatic aberration of magnification that the C- and g-lines produce in the same direction relative to the d-line in particular. To solve this problem according to the invention, it is preferable that the glass material that is larger in anomalous dispersion than an ordinary glass material to such an extent as to satisfy condition (4) is used for at least one negative lens in the negative lens group and at least one positive lens in the positive lens group, thereby making correction for the secondary spectra of that chromatic aberration of magnification.

With an ordinary superwie-angle lens, there are generally large fluctuations of astigmatism, distortion, spherical aberrations or the like with focusing on a nearby object point. To correct those aberrations at the same time, focusing should preferably be carried out by changing the space between at least two lenses in the negative lens group.

Further, if the negative lens group is divided in order from its object side into a first lens unit having negative refracting power, a second lens unit having negative or positive refracting power and a third lens unit having negative refracting power in such a way as to move the second lens unit toward its image plane side for focusing, those aberration fluctuations with focusing can then be minimized.

It is particularly preferable to allow the first and third lens unit to remain fixed during focusing, because focusing can be done without driving the heavy front lens.

Preferably, the first lens unit is made up of a first lens L1 that has negative refracting power and is in a meniscus form having a convex surface on its object side and a second lens L2 that is in a meniscus form having a convex surface on its object side, and the second lens unit is built up of a third lens L3 that has negative refracting power and is in a meniscus form having a convex surface on its object side, a fourth lens L4 that has negative refracting power and is in a meniscus form having a concave surface on its object side and a fifth lens L5 that has positive refracting power. With this arrangement, fluctuations of higher-order aberrations are minimized and the amount of driving focusing operation is easily controllable.

If, in this case, the second lens unit is divided into a first subunit of negative refracting power and a second subunit located on its image plane side and the space between the first subunit and the second subunit is changed upon focusing, high image-formation capability is then easily obtainable even at a closer-range object point.

Further, if the spaces between the adjacent lens surfaces in the lens group having negative refracting power and the lens group having positive refracting power are all kept constant all the time during zooming upon focusing of the zoom lens on an infinite object point, the driving mechanism during zooming can then be simplified.

Furthermore, if the zoom lens is allowed to work as a two-group lens during zooming upon focusing of the zoom lens on an infinite object point, the driving mechanism can then be much more simplified.

With the invention as described above, it is possible to obtain a wide-angle zoom lens that has an increased back focus and a shorter total length with a front lens of reduced diameter, and so lends itself well to a single-lens reflex camera incorporating an image pickup device.

Figure 1B:
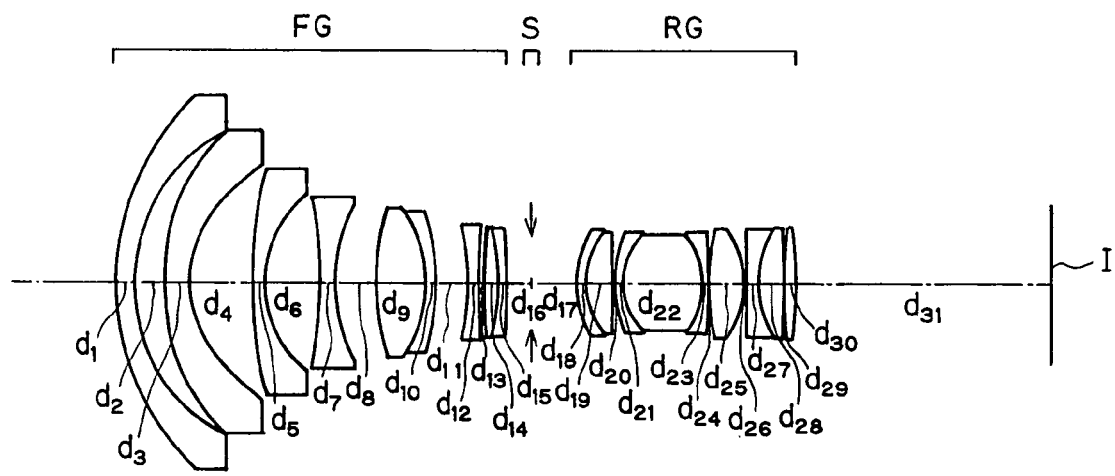
Figure 1C:
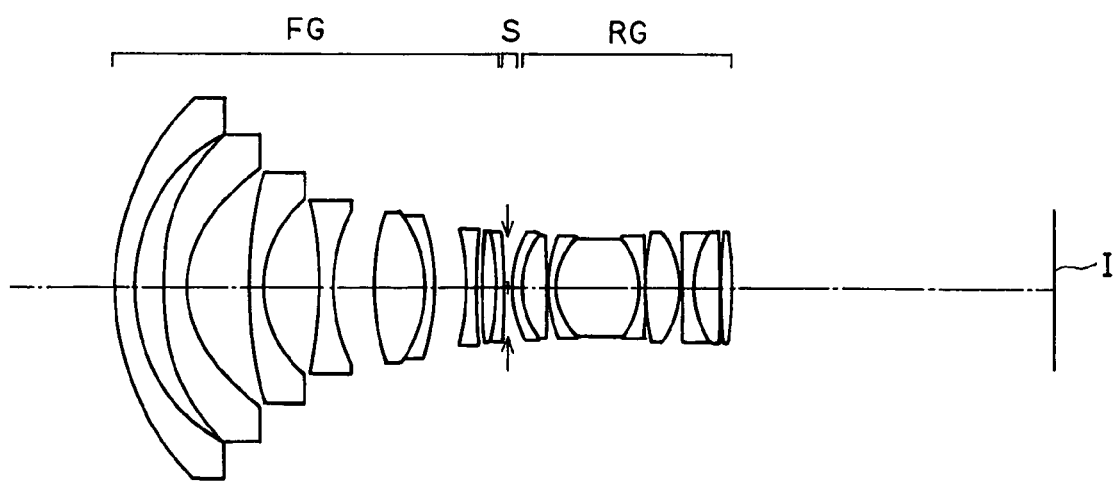
Figure 2A:
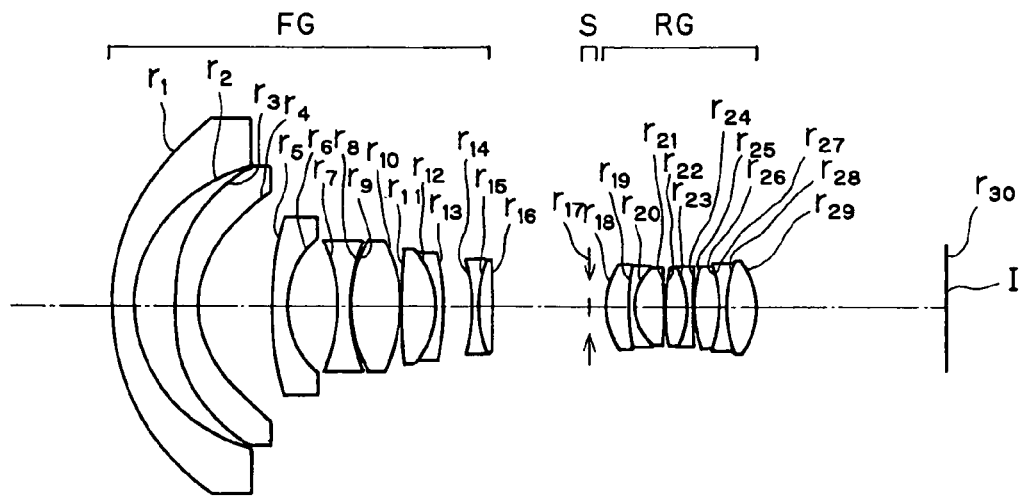
FIGS. 2(a), 2(b) and 2(c) are illustrative in lens arrangement section of Example 2 of the zoom lens according to the invention at the wide-angle end (a), in an intermediate setting (b) and at the telephoto end (c), respectively, upon focusing on an infinite object point.
Figure 2B:
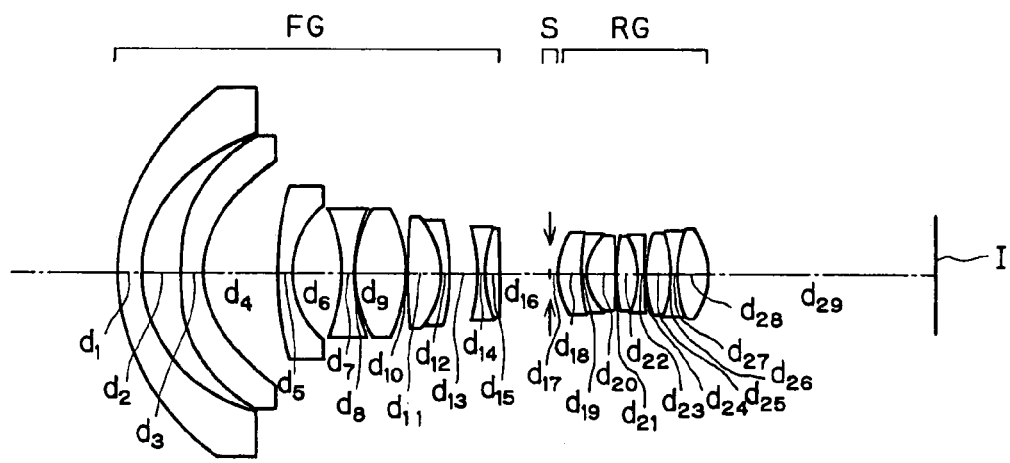
Figure 2C:
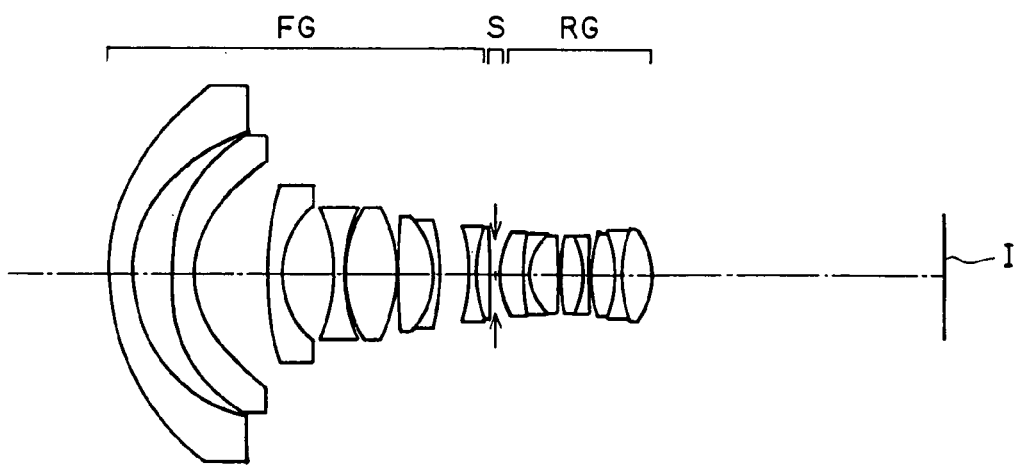
Figure 3A:
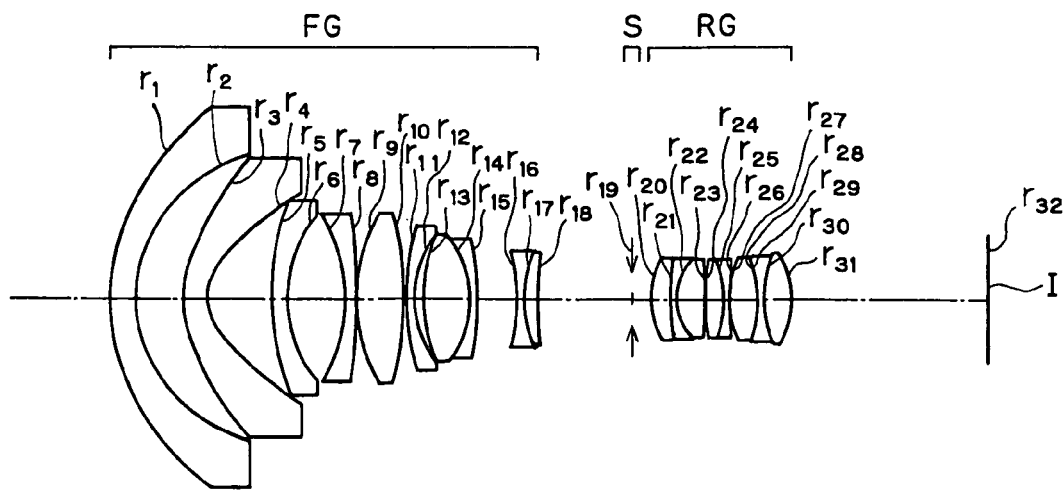
FIGS. 3(a), 3(b) and 3(c) are illustrative in lens arrangement section of Example 3 of the zoom lens according to the invention at the wide-angle end (a), in an intermediate setting (b) and at the telephoto end (c), respectively, upon focusing on an infinite object point.
Figure 3B:
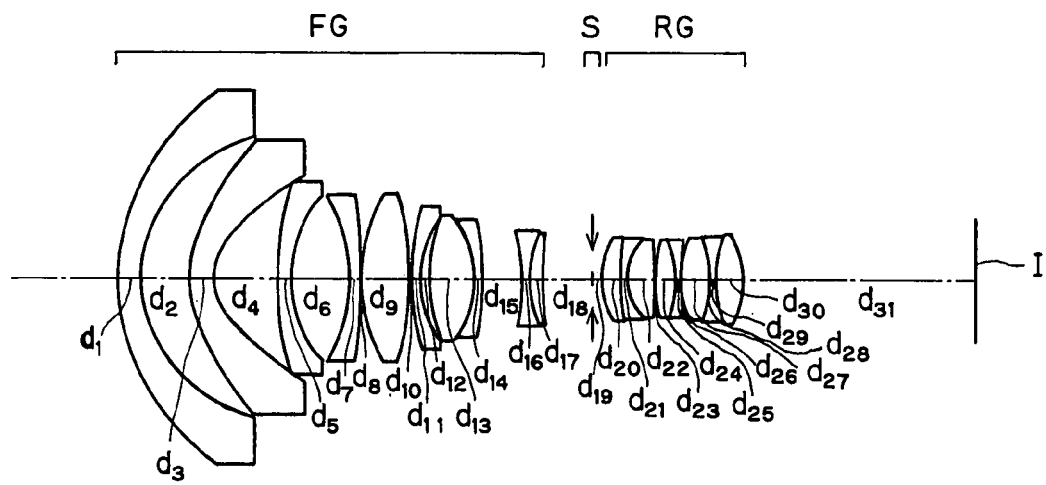
Figure 3C:
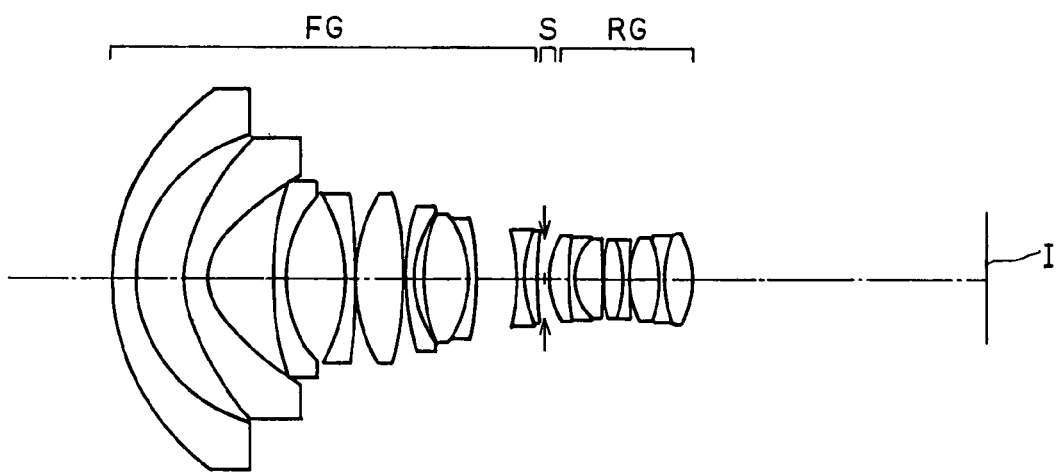
Figure 5A:
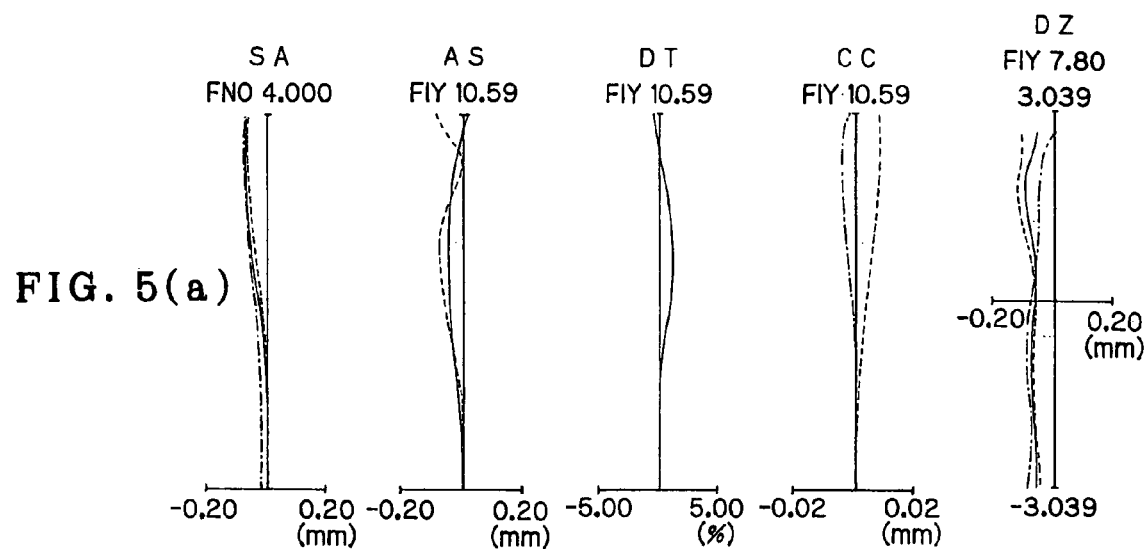
FIGS. 5(a), 5(b) and 5(c) are aberration diagrams for the zoom lens of Example 2 upon focusing on an infinite object point.
Figure 5B:
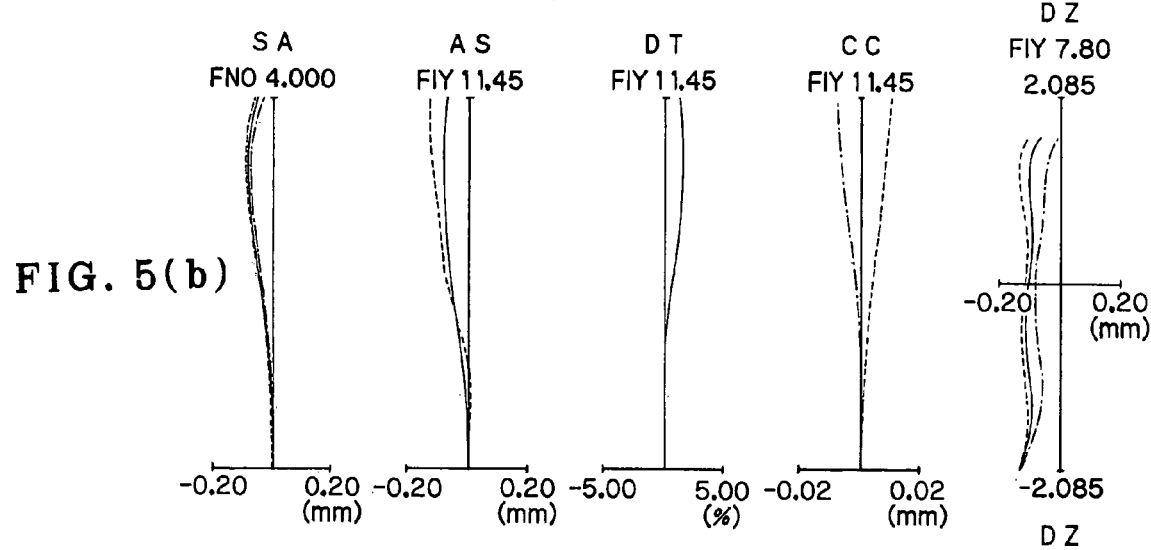
Figure 5C:
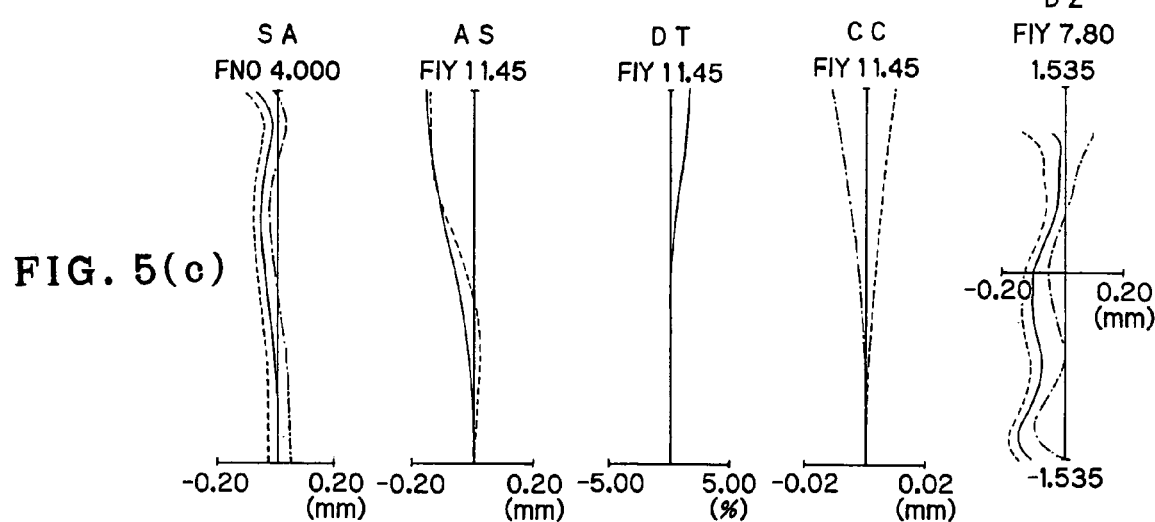

The zoom lens of the invention is now explained with reference to Example 1 to 3. FIGS. 1 to 3 are lens arrangement sections of Examples 1 to 3 (a) at their wide-angle ends, (b) in their intermediate settings, and (c) at their telephoto ends, respectively, upon focusing an infinite object point. In these drawings, FG stands for a front group, S an aperture stop, RG a rear group, and I an image plane.

EXAMPLE 1

As shown in FIG. 1, Example 1 is directed to a zoom optical system made up of, in order from its object side, a front group having negative refracting power, an aperture stop S and a rear group having positive refracting power. Upon zooming from the wide-angle end to the telephoto end of the optical system, the front group FG moves in a concave locus toward the object side, and is positioned nearer to the image plane side of the optical system at the telephoto end than at the wide-angle end, and the aperture stop S moves toward the object side with a decreasing space between it and the front group FG. The rear group RG moves monotonously toward the object side while the space between it and the aperture stop S becomes first wide and then narrow.

The front group FG is built up of, in order from its object side, three negative meniscus lenses, each convex on its object side; a double-concave negative lens; a doublet consisting of a double-convex positive lens and a negative meniscus lens convex on its image plane side; a double-concave negative lens; and a doublet consisting of a double-convex positive lens and a negative meniscus lens convex on its image plane side. The rear group RG is built up of, in order from its object side, a doublet consisting of a negative meniscus lens convex on its object side and a positive meniscus lens convex on its object side; a triplet consisting of a negative meniscus lens convex on its object side, a double-convex positive lens and a negative meniscus lens convex on its image plane side; a double-convex positive lens; a doublet consisting of a double-concave negative lens and a double-convex positive lens; and a double-convex positive lens.

Three aspheric surfaces are used: two at both surfaces of the second negative meniscus lens in the front group FG and one at the surface located in the rear group RG and nearest to its image plane side.

EXAMPLE 2

As shown in FIG. 2, Example 2 is directed to a zoom optical system made up of, in order from its object side, a front group FG having negative refracting power, an aperture stop S and a rear group RG having positive refracting power. Upon zooming from the wide-angle end to the telephoto end of the optical system, the front group FG moves in a concave locus toward the object side, and is positioned nearer to the image plane side of the optical system at the telephoto end than at the wide-angle end, and the aperture stop S moves toward the object side with a decreasing space between it and the front group FG. The rear group RG moves monotonously toward the object side while the space between it and the aperture stop S becomes first wide and then narrow.

The front group FG is built up of, in order from its object side, three negative meniscus lenses, each convex on its object side; a double-concave negative lens; a double-convex positive lens; a doublet consisting of a double-convex positive lens and a negative meniscus lens convex on its image plane side; a double-concave negative lens; and a doublet consisting of a double-concave negative lens and a positive meniscus lens convex on its image plane side. The rear group RG is built up of, in order from its object side, a triplet consisting of a positive meniscus lens convex on its object side, a negative meniscus lens convex on its object side and a double-convex positive lens; a doublet consisting of a double-convex positive lens and a double-concave negative lens; a double-convex positive lens; and a doublet consisting of a double-concave negative lens and a double-positive lens.

Four aspheric surfaces are used: two at both surfaces of the second negative lens in the front group FG and two at both surfaces of the double-convex positive lens that is a single lens in the rear group RG.

Focusing on a nearby object point is carried out by widening the space between the third negative meniscus lens in the front group FG and the next double-concave negative lens while that negative meniscus lens, the double-concave negative lens, the double-convex positive lens and the first doublet (consisting of a double-convex positive lens and a negative meniscus lens) are moved toward the image plane side.

EXAMPLE 3

As shown in FIG. 3, Example 3 is directed to a zoom optical system made up of, in order from its object side, a front group FG having negative refracting power, an aperture stop S and a rear group RG having positive refracting power. Upon zooming from the wide-angle end to the telephoto end of the optical system, the front group FG moves in a concave locus toward the object side, and arrives at the telephoto end where it is located at the same position as at the wide-angle end, and the aperture stop S moves toward the object side with a decreasing space between it and the front group FG. The rear group RG moves monotonously toward the object side while the space between it and the aperture stop S becomes narrow.

The front group FG is made up of, in order from its object side, three negative meniscus lenses, each convex on its object side; a negative meniscus lens concave on its object side; a double-convex positive lens; a negative meniscus lens convex on its object side; a doublet consisting of a double-convex positive lens and a negative meniscus lens convex on its image plane side; and a doublet consisting of a double-concave negative lens and a positive meniscus lens convex on its object side. The rear group RG is built up of, in order from its object side, a triplet consisting of a positive meniscus lens convex on its object side, a negative meniscus lens convex on its object side and a double-convex positive lens; a doublet consisting of a double-convex positive lens and a double-concave negative lens; a double-convex positive lens; and a doublet consisting of a double-concave negative lens and a double-convex positive lens.

Four aspheric surfaces are used: two at both surfaces of the second negative meniscus lens in the front group FG and two at both surfaces of the double-convex positive lens that is a single lens in the rear group RG.

Focusing on a nearby object point is carried out while the third negative meniscus lens, the fourth negative lens, the double-convex positive lens, the fifth negative meniscus lens and the first doublet (consisting of a double-convex positive lens and a negative meniscus lens) are moved toward the image plane side.

Set out below are numerical data on Examples 1 to 3. The symbols used hereinafter but not hereinbefore have the following meanings.

f: focal length of the whole optical system,
$F_{NO}$: F-number,
2ω: angle of view,
WE: wide-angle end,
ST: intermediate setting,
TE: telephoto end,
IO: object-image distance, $r_1, r_2, \ldots$ : radius of curvature of each lens surface,
$d_1, d_2, \ldots$ : space between adjacent lens surfaces,
$n_{d1}, n_{d2}, \ldots$ : d-line refractive index of each lens, and
$\nu_{d1}, \nu_{d2}, \ldots$ : Abbe constant of each lens.

It is here noted that the bracketed figure after the Abbe constant is indicative of $\theta_{g,F}$ of the glass material that satisfies condition (4). Here, if x is an optical axis with the proviso that the direction of travel of light is positive and y is a direction orthogonal to the optical axis, then aspheric shape is given by $$x=(y^2/r)/[1+\{1-(K+1)(y/r)^2\}^{1/2}]+A_4y^4+A_6y^6+A_8y^8+A_{10}y^{10}+A_{12}y^{12}+A_{14}y^{14}+A_{16}Y^{16}$$

Here r is a paraxial radius of curvature, K is a conical coefficient, and A4, A6, A8, A10, A12, A14 and A16 are the $4^{th}$-, $6^{th}$-, $8^{th}$-, $10^{th}$-, $12^{th}$-, $14^{th}$- and $16^{th}$-order aspherical coefficients, respectively.

In the numerical data on Examples 1 to 3, length is given in mm.

EXAMPLE 1

| | | | |
|---|---|---|---|
| $r_1 = 48.89$ | $d_1 = 3.4$ | $n_{d1} = 1.7859$ | $\nu_{d1} = 44.2$ |
| $r_2 = 32.03$ | $d_2 = 5.3$ | | |
| $r_3 = 118.85$ (Aspheric) | $d_3 = 4.0$ | $n_{d2} = 1.6935$ | $\nu_{d2} = 53.18$ |
| $r_4 = 25.43$ (Aspheric) | $d_4 = 10.6$ | | |
| $r_5 = 81.92$ | $d_5 = 2.6$ | $n_{d3} = 1.497$ | $\nu_{d3} = 81.54(0.54)$ |
| $r_6 = 21.01$ | $d_6 = 9.5$ | | |
| $r_7 = -83.56$ | $d_7 = 2.4$ | $n_{d4} = 1.497$ | $\nu_{d4} = 81.54(0.54)$ |
| $r_8 = 29.65$ | $d_8 = 7.0$ | | |
| $r_9 = 44.78$ | $d_9 = 9.4$ | $n_{d5} = 1.58144$ | $\nu_{d5} = 40.75$ |
| $r_{10} = -22.78$ | $d_{10} = 1.6$ | $n_{d6} = 1.8061$ | $\nu_{d6} = 40.92$ |
| $r_{11} = -45.86$ | $d_{11} = 5.8$ | | |
| $r_{12} = -45.98$ | $d_{12} = 2.0$ | $n_{d7} = 1.60569$ | $\nu_{d7} = 64.35$ |
| $r_{13} = 112.25$ | $d_{13} = 0.7$ | | |
| $r_{14} = 82.46$ | $d_{14} = 3.0$ | $n_{d8} = 1.63219$ | $\nu_{d8} = 38.56$ |
| $r_{15} = -41.85$ | $d_{15} = 1.4$ | $n_{d9} = 1.8061$ | $\nu_{d9} = 40.92$ |
| $r_{16} = -130.83$ | $d_{16}$ = (Variable) | | |
| $r_{17} = \infty$ (Stop) | $d_{17}$ = (Variable) | | |
| $r_{18} = 19.89$ | $d_{18} = 1.7$ | $n_{d10} = 1.84423$ | $\nu_{d10} = 43.47$ |
| $r_{19} = 14.81$ | $d_{19} = 4.7$ | $n_{d11} = 1.50277$ | $\nu_{d11} = 57.11$ |
| $r_{20} = 2023.35$ | $d_{20} = 0.1$ | | |
| $r_{21} = 23.26$ | $d_{21} = 1.3$ | $n_{d12} = 1.83481$ | $\nu_{d12} = 42.71$ |
| $r_{22} = 11.92$ | $d_{22} = 14.5$ | $n_{d13} = 1.47601$ | $\nu_{d13} = 48.03$ |
| $r_{23} = -13.77$ | $d_{23} = 0.9$ | $n_{d14} = 1.78904$ | $\nu_{d14} = 51.29$ |
| $r_{24} = -169.86$ | $d_{24} = 0.1$ | | |
| $r_{25} = 58.06$ | $d_{25} = 6.0$ | $n_{d15} = 1.43875$ | $\nu_{d15} = 94.93(0.53)$ |
| $r_{26} = -16.96$ | $d_{26} = 0.3$ | | |
| $r_{27} = -1187.28$ | $d_{27} = 2.0$ | $n_{d16} = 1.883$ | $\nu_{d16} = 40.76$ |
| $r_{28} = 17.55$ | $d_{28} = 5.0$ | $n_{d17} = 1.497$ | $\nu_{d17} = 81.54(0.54)$ |
| $r_{29} = -122.49$ | $d_{29} = 0.0$ | | |
| $r_{30} = 155.04$ | $d_{30} = 2.0$ | $n_{d18} = 1.48749$ | $\nu_{d18} = 70.23$ |
| $r_{31} = -73.19$ (Aspheric) | $d_{31}$ = (Variable) | | |
| $r_{32} = \infty$ (Image plane) | | | |

Aspherical Coefficients

3rd surface

K = 0
$A_4 = 2.54 \times 10^{-5}$
$A_6 = -2.79 \times 10^{-8}$
$A_8 = 1.90 \times 10^{-11}$
$A_{10} = -6.99 \times 10^{-15}$

4th surface

K = 0
$A_4 = 1.83 \times 10^{-5}$
$A_6 = 2.77 \times 10^{-8}$
$A_8 = -1.62 \times 10^{-10}$
$A_{10} = 7.05 \times 10^{-14}$

31th surface

K = 0
$A_4 = 1.01 \times 10^{-5}$
$A_6 = -7.24 \times 10^{-29}$
$A_8 = 7.02 \times 10^{-11}$
$A_{10} = -5.76 \times 10^{-13}$

Spaces between Zoom-lens Groups

| | WE | ST | TE |
|---|---|---|---|
| f (mm) | 9.5 | 13.3 | 18.3 |
| IO | $\infty$ | $\infty$ | $\infty$ |
| $F_{NO}$ | 4 | 4 | 4 |
| 2ω (°) | 112.9 | 93.9 | 76.4 |
| $d_{16}$ | 27.5 | 4.4 | 0.5 |
| $d_{17}$ | 0.9 | 7.8 | 0.7 |
| $d_{31}$ | 35.8 | 44.9 | 56.7 |

EXAMPLE 2

| | | | |
|---|---|---|---|
| $r_1 = 42.11$ | $d_1 = 4$ | $n_{d1} = 1.7859$ | $\nu_{d1} = 44.2$ |
| $r_2 = 26.28$ | $d_2 = 6.9$ | | |
| $r_3 = 73.84$ (Aspheric) | $d_3 = 4.0$ | $n_{d2} = 1.6935$ | $\nu_{d2} = 53.18$ |
| $r_4 = 23.46$ (Aspheric) | $d_4$ = (Variable) | | |
| $r_5 = 58.97$ | $d_5 = 2.7$ | $n_{d3} = 1.883$ | $\nu_{d3} = 40.76$ |
| $r_6 = 16.18$ | $d_6$ = (Variable) | | |
| $r_7 = -26.89$ | $d_7 = 2.0$ | $n_{d4} = 1.497$ | $\nu_{d4} = 81.54(0.54)$ |
| $r_8 = 27.47$ | $d_8 = 0.2$ | | |
| $r_9 = 22.93$ | $d_9 = 9.2$ | $n_{d5} = 1.50636$ | $\nu_{d5} = 48.2$ |
| $r_{10} = -27.19$ | $d_{10} = 0.2$ | | |
| $r_{11} = 124.07$ | $d_{11} = 6.1$ | $n_{d6} = 1.61307$ | $\nu_{d6} = 35.15$ |
| $r_{12} = -16.10$ | $d_{12} = 1.3$ | $n_{d7} = 1.9054$ | $\nu_{d7} = 39.36$ |
| $r_{13} = -46.50$ | $d_{13}$ = (Variable) | | |
| $r_{14} = -31.85$ | $d_{14} = 1.2$ | $n_{d8} = 1.71943$ | $\nu_{d8} = 53.8$ |
| $r_{15} = 23.01$ | $d_{15} = 2.4$ | $n_{d9} = 1.86085$ | $\nu_{d9} = 38.33$ |
| $r_{16} = 660.84$ | $d_{16}$ = (Variable) | | |
| $r_{17} = \infty$ (Stop) | $d_{17}$ = (Variable) | | |
| $r_{18} = 13.54$ | $d_{18} = 4.4$ | $n_{d10} = 1.51742$ | $\nu_{d10} = 52.43$ |
| $r_{19} = 41.17$ | $d_{19} = 1.0$ | $n_{d11} = 1.883$ | $\nu_{d11} = 40.76$ |
| $r_{20} = 9.38$ | $d_{20} = 5.2$ | $n_{d12} = 1.62004$ | $\nu_{d12} = 36.26$ |
| $r_{21} = -604.56$ | $d_{21} = 0.2$ | | |
| $r_{22} = 30.77$ | $d_{22} = 4.0$ | $n_{d13} = 1.497$ | $\nu_{d13} = 81.54(0.54)$ |
| $r_{23} = -16.10$ | $d_{23} = 1.1$ | $n_{d14} = 1.717$ | $\nu_{d14} = 47.92$ |
| $r_{24} = 102.86$ | $d_{24} = 0.2$ | | |
| $r_{25} = 22.11$ (Aspheric) | $d_{25} = 4.4$ | $n_{d15} = 1.497$ | $\nu_{d15} = 81.54(0.54)$ |
| $r_{26} = -19.09$ (Aspheric) | $d_{26} = 0.2$ | | |
| $r_{27} = -22.22$ | $d_{27} = 1.1$ | $n_{d16} = 1.883$ | $\nu_{d16} = 40.76$ |
| $r_{28} = 21.37$ | $d_{28} = 5.8$ | $n_{d17} = 1.48749$ | $\nu_{d17} = 70.23$ |
| $r_{29} = -13.75$ | $d_{29}$ = (Variable) | | |
| $r_{30} = \infty$ (Image plane) | | | |

Aspherical Coefficients

3rd surface

K = 0
$A_4 = 4.36 \times 10^{-5}$
$A_6 = -8.08 \times 10^{-8}$
$A_8 = 9.94 \times 10^{-11}$
$A_{10} = -3.90 \times 10^{-14}$
$A_{12} = -6.99 \times 10^{-17}$
$A_{14} = 8.97 \times 10^{-20}$
$A_{16} = 2.52 \times 10^{-23}$ -continued 4th surface $K = 0$
$A_4 = 4.07 \times 10^{-5}$
$A_6 = -3.81 \times 10^{-8}$
$A_8 = -2.68 \times 10^{-10}$
$A_{10} = 8.78 \times 10^{-14}$
$A_{12} = 7.09 \times 10^{-16}$
$A_{14} = 9.78 \times 10^{-19}$
$A_{16} = -3.04 \times 10^{-21}$ 25th surface $K = 0$
$A_4 = -1.58 \times 10^{-5}$
$A_6 = 3.26 \times 10^{-7}$
$A_8 = -7.53 \times 10^{-9}$
$A_{10} = 9.61 \times 10^{-12}$
$A_{12} = 0$
$A_{14} = 0$
$A_{16} = 0$ 26th surface $K = 0$
$A_4 = 6.91 \times 10^{-5}$
$A_6 = 2.15 \times 10^{-7}$
$A_8 = -9.21 \times 10^{-9}$
$A_{10} = 7.32 \times 10^{-12}$
$A_{12} = 0$
$A_{14} = 0$
$A_{16} = 0$

| | Spaces between Zoom-lens Groups | | | Spaces between Focusing-lens Groups | | |
|---|---|---|---|---|---|---|
| | WE | ST | TE | WE | ST | TE |
| f (mm) | 7.1 | 9.6 | 13.7 | 7.1 | 9.6 | 13.7 |
| IO (mm) | ∞ | ∞ | ∞ | 250 | 250 | 265 |
| $F_{NO}$ | 4 | 4 | 4 | | | |
| 2ω (°) | 114.7 | 97.8 | 78.2 | | | |
| $d_4$ | 13.0 | 13.0 | 13.0 | 16.0 | 16.0 | 16.0 |
| $d_6$ | 9.3 | 9.3 | 9.3 | 10.6 | 10.6 | 10.6 |
| $d_{13}$ | 5.1 | 5.1 | 5.1 | 0.7 | 0.7 | 0.7 |
| $d_{16}$ | 17.0 | 9.0 | 1.0 | 17.0 | 9.0 | 1.0 |
| $d_{17}$ | 2.9 | 1.1 | 0.5 | 2.9 | 1.1 | 0.5 |
| $d_{29}$ | 33.7 | 40.8 | 52.7 | 33.7 | 40.8 | 52.6 |

EXAMPLE 3

| | | | |
|---|---|---|---|
| $r_1 = 42.38$ | $d_1 = 4.0$ | $n_{d1} = 1.7859$ | $v_{d1} = 44.2$ |
| $r_2 = 26.39$ | $d_2 = 8.3$ | | |
| $r_3 = 19.41$ (Aspheric) | $d_3 = 4.0$ | $n_{d2} = 1.6935$ | $v_{d2} = 53.18$ |
| $r_4 = 9.03$ (Aspheric) | $d_4 = $ (Variable) | | |
| $r_5 = 58.69$ | $d_5 = 2.7$ | $n_{d3} = 1.883$ | $v_{d3} = 40.76$ |
| $r_6 = 22.88$ | $d_6 = 10.5$ | | |
| $r_7 = -29.48$ | $d_7 = 2.0$ | $n_{d4} = 1.497$ | $v_{d4} = 81.54(0.54)$ |
| $r_8 = -116.05$ | $d_8 = 0.2$ | | |
| $r_9 = 31.08$ | $d_9 = 8.5$ | $n_{d5} = 1.54814$ | $v_{d5} = 45.79$ |
| $r_{10} = -53.55$ | $d_{10} = 0.3$ | | |
| $r_{11} = 48.04$ | $d_{11} = 1.6$ | $n_{d6} = 1.497$ | $v_{d6} = 81.54(0.54)$ |
| $r_{12} = 20.03$ | $d_{12} = 1.8$ | | |
| $r_{13} = 34.68$ | $d_{13} = 7.8$ | $n_{d7} = 1.55715$ | $v_{d7} = 40.9$ |
| $r_{14} = -19.04$ | $d_{14} = 1.3$ | $n_{d8} = 1.883$ | $v_{d8} = 40.76$ |
| $r_{15} = -52.67$ | $d_{15} = $ (Variable) | | |
| $r_{16} = -37.33$ | $d_{16} = 1.2$ | $n_{d9} = 1.71628$ | $v_{d9} = 54.33$ |
| $r_{17} = 20.49$ | $d_{17} = 2.4$ | $n_{d10} = 1.87753$ | $v_{d10} = 35.66$ |
| $r_{18} = 109.36$ | $d_{18} = $ (Variable) | | |
| $r_{19} = \infty$ (Stop) | $d_{19} = $ (Variable) | | |
| $r_{20} = 13.86$ | $d_{20} = 3.6$ | $n_{d11} = 1.51742$ | $v_{d11} = 52.43$ |
| $r_{21} = 60.31$ | $d_{21} = 1.0$ | $n_{d12} = 1.883$ | $v_{d12} = 40.76$ |
| $r_{22} = 9.91$ | $d_{22} = 4.9$ | $n_{d13} = 1.62004$ | $v_{d13} = 36.26$ |
| $r_{23} = -813.03$ | $d_{23} = 0.2$ | | |
| $r_{24} = 29.64$ | $d_{24} = 3.5$ | $n_{d14} = 1.497$ | $v_{d14} = 81.54(0.54)$ |
| $r_{25} = -22.01$ | $d_{25} = 1.1$ | $n_{d15} = 1.717$ | $v_{d15} = 47.92$ |
| $r_{26} = 90.03$ | $d_{26} = 0.2$ | | |
| $r_{27} = 21.38$ (Aspheric) | $d_{27} = 4.9$ | $n_{d16} = 1.497$ | $v_{d16} = 81.54(0.54)$ |
| $r_{28} = -19.60$ (Aspheric) | $d_{28} = 0.2$ | | |
| $r_{29} = -24.00$ | $d_{29} = 1.1$ | $n_{d17} = 1.883$ | $v_{d17} = 40.76$ |
| $r_{30} = 21.52$ | $d_{30} = 5.2$ | $n_{d18} = 1.48749$ | $v_{d18} = 70.23$ |
| $r_{31} = -15.06$ | $d_{31} = $ (Variable) | | |
| $r_{32} = \infty$ (Image plane) | | | |

Aspherical Coefficients

3rd surface $K = -3.8916$
$A_4 = 9.77 \times 10^{-6}$
$A_6 = -4.37 \times 10^{-8}$
$A_8 = 1.17 \times 10^{-10}$
$A_{10} = -1.27 \times 10^{-13}$
$A_{12} = 5.54 \times 10^{-17}$ 4th surface $K = -0.8703$
$A_4 = -5.31 \times 10^{-5}$
$A_6 = -3.19 \times 10^{-8}$
$A_8 = -4.60 \times 10^{-11}$
$A_{10} = 9.59 \times 10^{-13}$
$A_{12} = -1.80 \times 10^{-15}$ 27th surface $K = 0$
$A_4 = -2.74 \times 10^{-5}$
$A_6 = 2.89 \times 10^{-7}$
$A_8 = -6.40 \times 10^{-9}$
$A_{10} = 4.86 \times 10^{-11}$
$A_{12} = 0$ 28th surface $K = 0$
$A_4 = 5.49 \times 10^{-5}$
$A_6 = 1.69 \times 10^{-7}$
$A_8 = -7.78 \times 10^{-9}$
$A_{10} = 5.31 \times 10^{-11}$
$A_{12} = 0$

| | Spaces between Zoom-lens Groups | | | Spaces between Focusing-lens Groups | | |
|---|---|---|---|---|---|---|
| | WE | ST | TE | WE | ST | TE |
| f (mm) | 7.1 | 9.6 | 13.7 | 7.1 | 9.6 | 13.7 |
| IO (mm) | ∞ | ∞ | ∞ | 250 | 250 | 250 |
| $F_{NO}$ | 4 | 4 | 4 | | | |
| 2ω (°) | 114.7 | 97.9 | 78.2 | | | |
| $d_4$ | 11.6 | 11.6 | 11.6 | 17.3 | 17.3 | 17.3 |
| $d_{15}$ | 6.8 | 6.8 | 6.8 | 1.1 | 1.1 | 1.1 |
| $d_{18}$ | 16.7 | 8.6 | 1.1 | 16.7 | 8.6 | 1.1 |
| $d_{19}$ | 3.2 | 1.6 | 0.6 | 3.2 | 1.6 | 0.6 |
| $d_{31}$ | 33.6 | 40.4 | 51.8 | 33.6 | 40.4 | 51.8 |

Figure 6A:
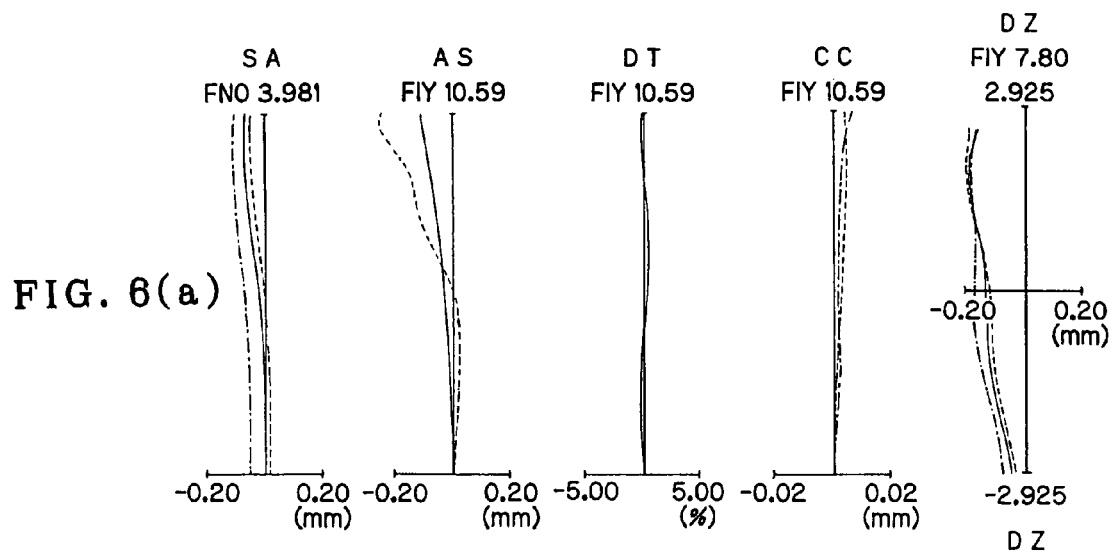
FIGS. 6(a), 6(b) and 6(c) are aberration diagrams for the zoom lens of Example 2 upon focusing on a close-range distance.
Figure 6B:
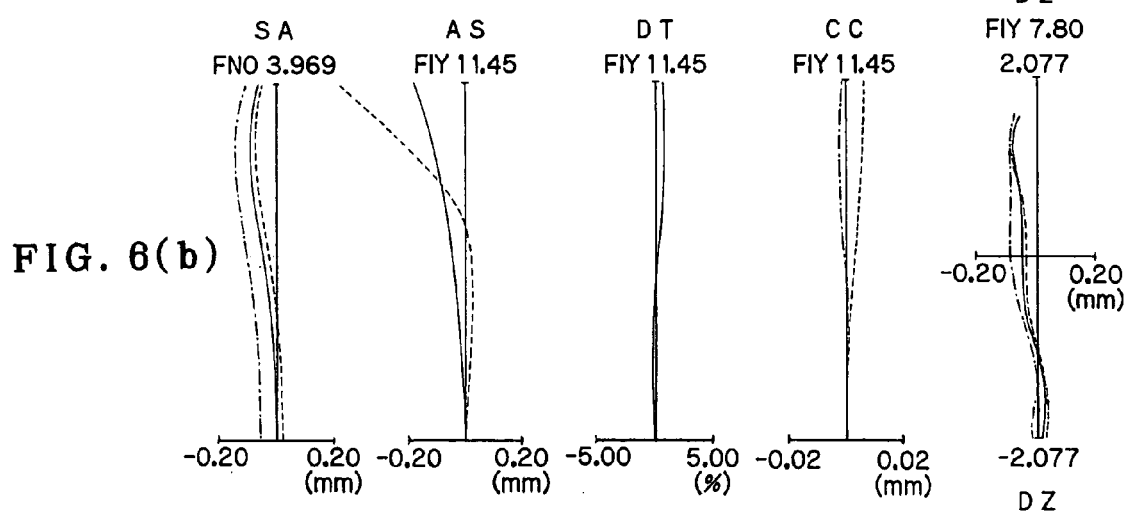
Figure 6C:
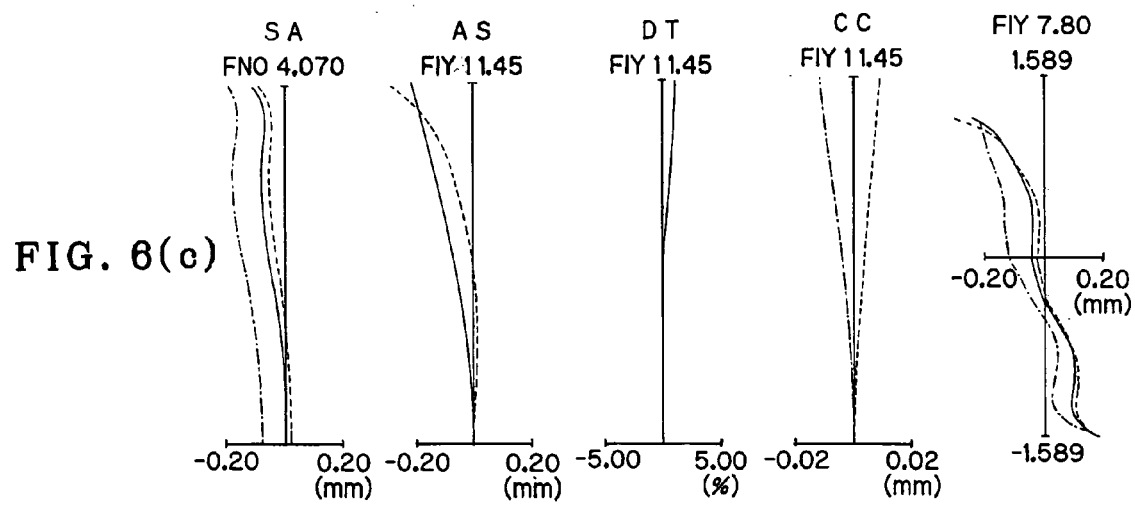
Figure 7A:
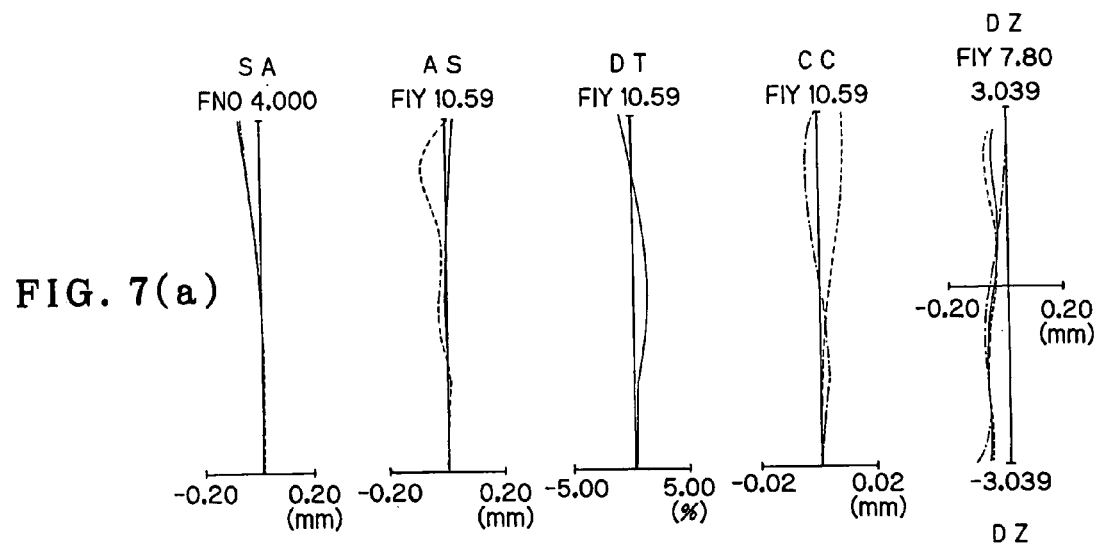
FIGS. 7(*a*), 7(*b*) and 7(*c*) are aberration diagrams for the zoom lens of Example 3 upon focusing on an infinite object point.
Figure 7B:
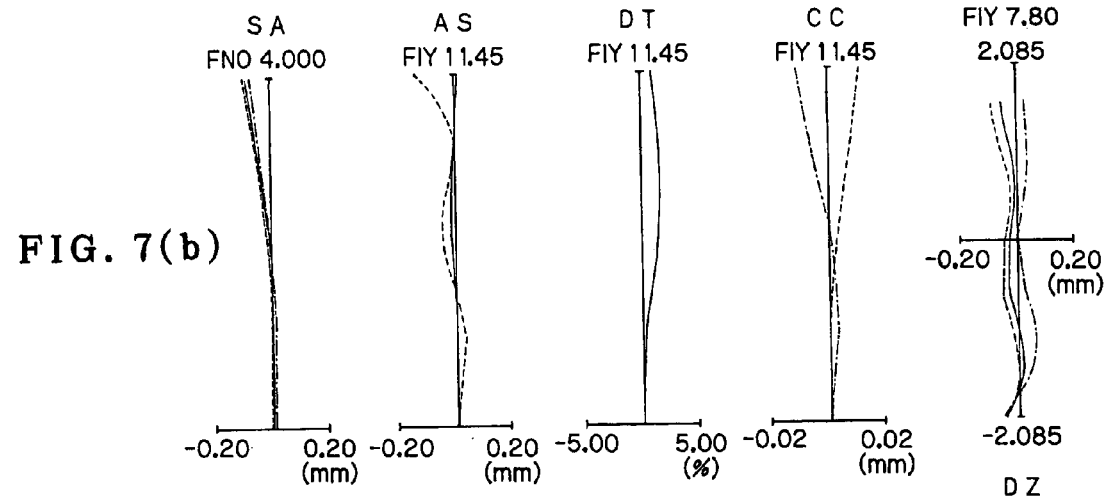
Figure 7C:
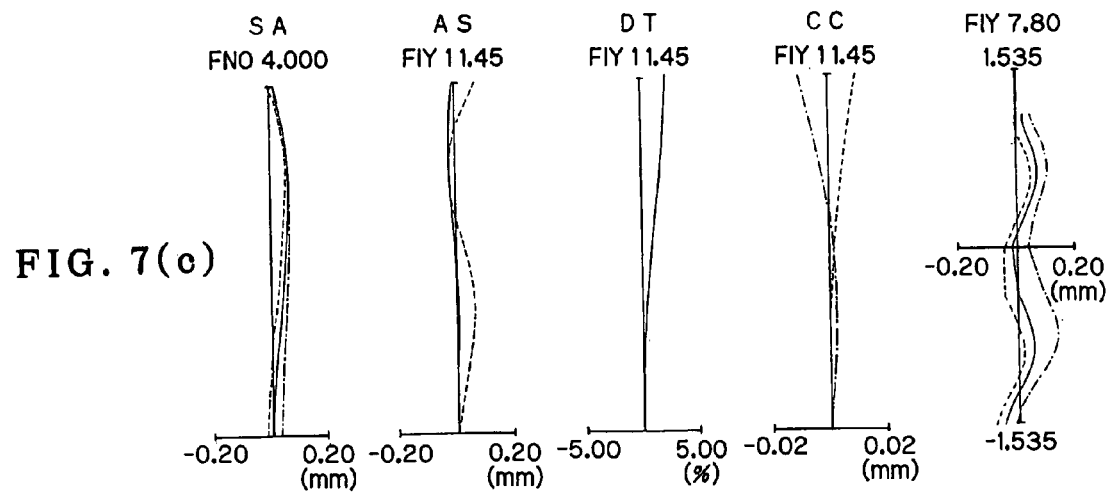
Figure 8A:
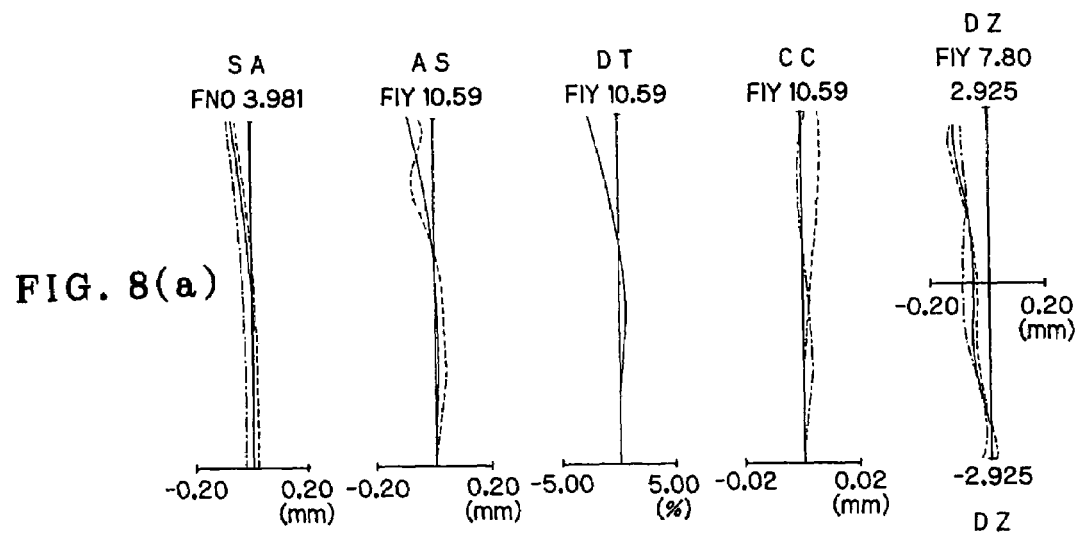
FIGS. 8(*a*), 8(*b*) and 8(*c*) are aberration diagrams for the zoom lens of Example 3 upon focusing on a close-range distance.
Figure 8B:
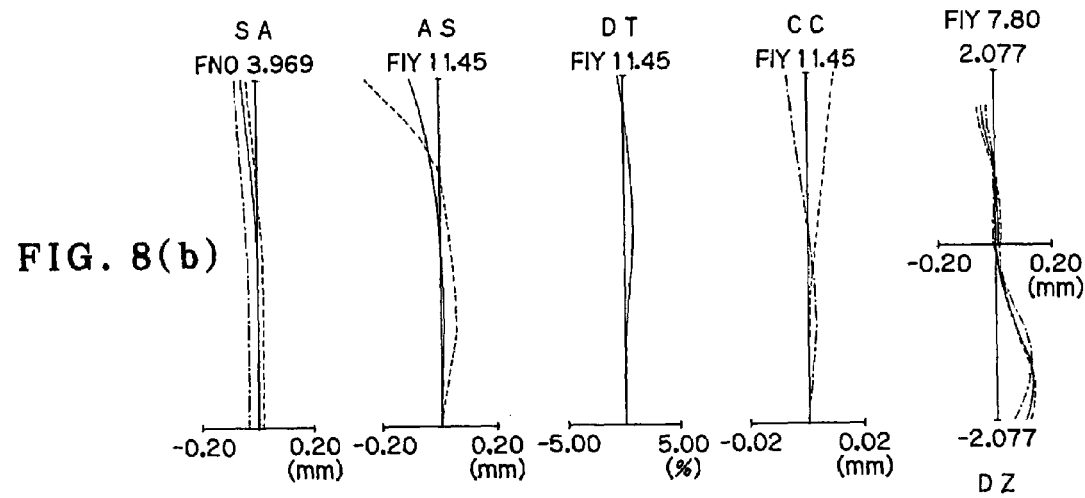
Figure 8C:
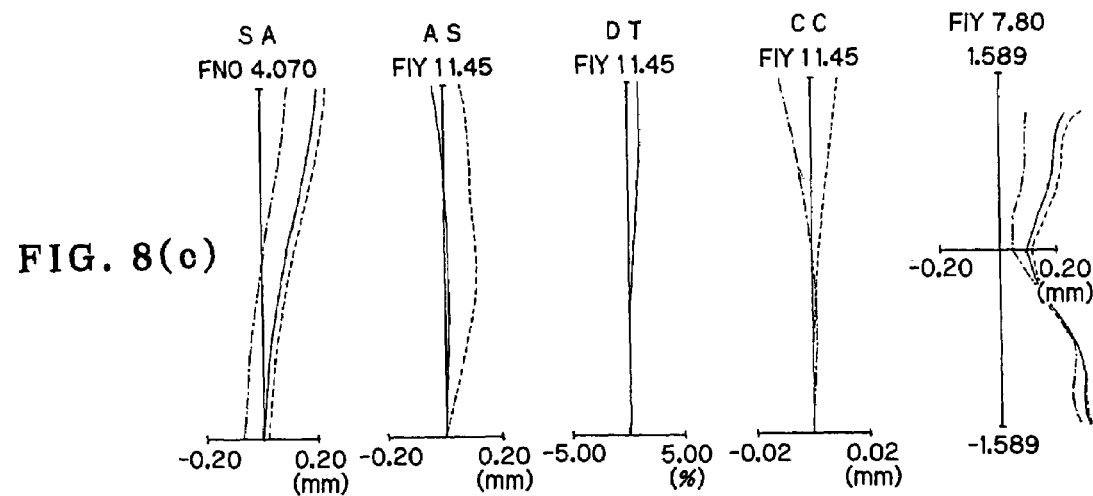

FIGS. 4 to 7 are aberration diagrams for Examples 1 to 3, respectively, upon focusing on an infinite object point and FIGS. 6 and 8 are aberrations diagrams for Examples 2 and 3, respectively, upon a close-range distance (an object-image distance IO). Spherical aberrations (SA), astigmatisms (AS), distortions (DT), chromatic aberrations of magnification (CC) and comas (DZ) at the wide-angle end (a), in the intermediate setting (b) and at the telephoto end are shown in these diagrams, wherein "FIY" represents an image height.

Given below are the values of conditions (1) to (3) in Examples 1, 2 and 3.

| Condition | Example 1 | Example 2 | Example 3 |
|---|---|---|---|
| (1) | 2.40 | 2.89 | 2.77 |
| (2) | 2.40 | 2.89 | 2.77 |
| (3) | 1.33 | 0.02 | 0.02 |

Also, given below are the values of the right term of condition (4) for the glass materials of $n_d=1.497$ and $v_d=81.54$, and $n_d=1.43875$ and $v_d=94.93$ used in Examples 1, 2 and 3.

$v_d$ 81.54 94.93
$-0.0016 \times v_d + 0.65$ 0.52 0.50

Figure 9:
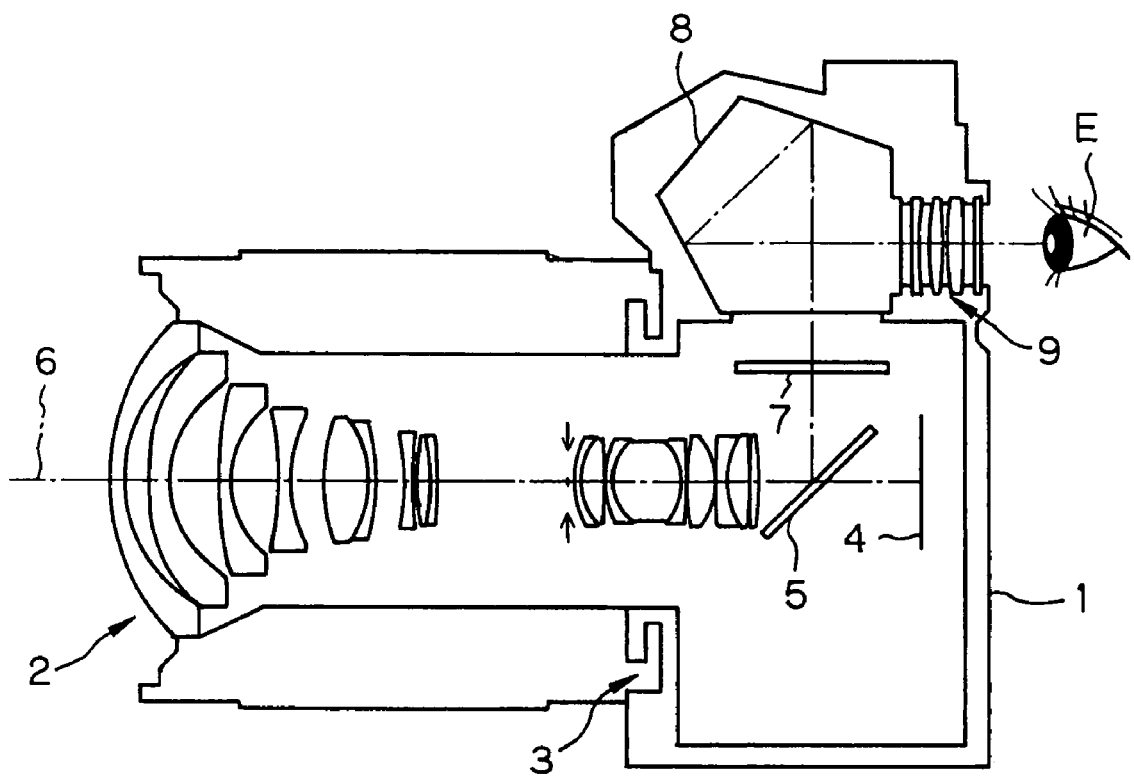
FIG. 9 is illustrative in section of a single-lens reflex camera incorporating the inventive zoom lens.

FIG. 9 is illustrative in section of a lens inter-changeable, single-lens reflex camera that incorporates the inventive zoom lens and uses a small-format CCD or C-MOS or the like as an image pickup device. In FIG. 9, reference numeral 1 represents a single-lens reflex camera, 2 an inventive taking lens system received in a lens barrel equipped with a zooming mechanism and a focusing mechanism, and 3 a mount of the lens barrel, which is capable of attaching or detaching the taking lens system 2 to or from the single-lens reflex camera 1. For that mount, the screw type mount or the bayonet type mount could be used. In this embodiment, the bayonet type mount is used.

Reference numeral 4 stands for an image pickup device plane, 5 a quick return mirror interposed between the lens system and the image pickup device plane 4 on an optical path 6 of the taking lens system 2, 7 a finder screen located on an optical path of light reflected by the quick return mirror 5, 8 a penta prism, 9 a finder, and E a viewer's eye (eye point).

The inventive wide-angle zoom lens such as one according to Example 1 could be used as the taking lens system 2 in the single-lens reflex camera 1 of such construction.

What we claim is:

1. A zoom lens, comprising, in order from an object side to an image side thereof,
   a lens group having negative refracting power, and
   a lens group having positive refracting power, wherein:
   zooming is carried out with a change in a space between at least said two lens groups,
   said lens group having negative refracting power comprises a plurality of aspheric surfaces,
   said lens group having positive refracting power comprises at least one aspheric surface, and
   said lens group having negative refracting power comprises at least three negative lenses, with satisfaction of condition (1):

$$2.3 \leq |f_2/f_1| \leq 3.1 \quad (1)$$

where $f_1$ is a focal length of said lens group having negative refracting power, and $f_2$ is a focal length of said lens group having positive refracting power.

2. The zoom lens according to claim 1, which satisfies condition (2):

$$2.05 \leq |f_{2A}/f_1| \leq 3.5 \quad (2)$$

where $f_{2A}$ is a focal length of a combined system on the image side of the zoom lens with respect to said lens group having negative refracting power at the wide-angle end, and $f_1$ is a focal length of said lens group having negative refracting power.

3. The zoom lens according to claim 1, wherein at least one negative lens in said lens group having negative refracting power, and at least one positive lens in said lens group having positive refracting power is each formed of a glass material that satisfies condition (4):

$$\theta_{g,F} \leq -0.0016 \times v_d + 0.65 \quad (4)$$

where $\theta g, F = (n_g - n_F)/(n_F - n_C)$,
   $v_d = (n_d - 1)/(n_F - n_C)$,
   $n_g$ is a g-line refractive index,
   $n_F$ is an F-line refractive index,
   $n_d$ is a d-line refractive index, and
   $n_C$ is a C-line refractive index.

4. The zoom according to claim 1, wherein:
   focusing is carried out by changing a space between at least two lenses in said lens group having negative refracting power.

5. The zoom lens according to claim 4, wherein:
   said lens group having negative refracting power comprises, in order from an object side thereof,
   a first lens unit having negative refracting power,
   a second lens unit having negative or positive refracting power, and
   a third lens unit having negative refracting power, wherein focusing is carried out by moving said second lens unit toward the image plane side and changing a space between said first lens unit and said second lens unit an a space between said second lens unit and said third lens unit.

6. The zoom lens according to claim 5, wherein:
   during said focusing, said first lens unit and said lens unit remain fixed.

7. The zoom lens according to claim 6, wherein:
   said second lens unit consists of a first subunit of negative refracting power and a second subunit located on an image plane side of said first subunit, and
   upon focusing, said first subunit and second subunit move toward the image plane side with a change in a space between first subunit and said second subunit.

8. The zoom lens according to claim 5, wherein:
   said first lens unit consists of:
   a first lens L1 that has negative refracting power and is in a meniscus form having a convex surface on an object side thereof, and
   a second lens L2 that is in a meniscus form having a 10 convex surface on an object side thereof, and
   said second lens unit comprises:
   a third lens L3 that has negative refracting power and is in a meniscus form having a convex surface on an object side thereof,
   a fourth lens L4 that has negative refracting power and a concave surface on an object side thereof, and
   a fifth lens L5 that has positive refracting power.

9. The zoom lens according to claim 8, wherein:
   said second lens unit consists of a first subunit of negative refracting power, and a second subunit located on an image plane side of said first subunit, and
   upon focusing, said first subunit and second subunit move toward the image plane side with a change in a space between first subunit and said second subunit.

10. The zoom lens according to claim 1, wherein:
    spaces between lens surfaces in said lens group having negative refracting power and in said lens group having positive refracting power are all kept constant all the time during zooming upon focusing on an infinite object point.

11. The zoom lens according to claim 10, which takes a two-group zoom lens form during zooming upon focusing on an infinite object point.

12. A zoom lens, comprising, in order from an object side to an image side thereof, a lens group having negative refracting power, and a lens group having positive refracting power, wherein:

zooming is carried out with a change in a space between at least said two lens groups, and said lens group having negative refracting power comprises, in order from an object side thereof, a first lens L1 that has negative refracting power and is in a meniscus form having a convex surface on an object side thereof, a second lens L2 that is in a meniscus form having a convex surface on an object side thereof, a third lens L3 that has negative refracting power and is in a meniscus form having a convex surface on an object side thereof, a fourth lens L4 that has negative refracting power and a concave surface on an object side thereof, a fifth lens L5 having positive refracting power, a negative lens located on an image side of the zoom lens with respect to said fifth lens L5, said lens group having negative refracting power comprises a plurality of aspheric surfaces, and said lens group having positive refracting power comprises at least one aspheric surface.

13. A zoom lens, comprising, in order from an object side to an image side thereof, a lens group having negative refracting power, and a lens group having positive refracting power, wherein:

zooming is carried out with a change in a space between at least said two lens groups, and said lens group having negative refracting power comprises, in order from an object side thereof, a first lens L1 that has negative refracting power and is in a meniscus form having a convex surface on an object side thereof, a second lens L2 that is in a meniscus form having a convex surface on an object side thereof, a third lens L3 that has negative refracting power and is in a meniscus form having a convex surface on an object side thereof, a fourth lens L4 that has negative refracting power and a concave surface on an object side thereof, a fifth lens L5 having positive refracting power, a negative lens located on an image side of the zoom lens with respect to said fifth lens L5, and wherein the zoom lens satisfies condition (2):

$$2.0 \leq |f_{2A}/f_1| \leq 3.5 \qquad (2)$$

where $f_{2A}$ is a focal length of a combined system on the image side of the zoom lens with respect to said lens group having negative refracting power at the wide-angle end, and $f_1$ is a focal length of said lens group having negative refracting power.

14. A zoom lens, comprising, in order from an object side to an image side thereof, a lens group having negative refracting power, and a lens group having positive refracting power, wherein:

zooming is carried out with a change in a space between at least said two lens groups, and said lens group having negative refracting power comprises, in order from an object side thereof, a first lens L1 that has negative refracting power and is in a meniscus form having a convex surface on an object side thereof, a second lens L2 that is in a meniscus form having a convex surface on an object side thereof, a third lens L3 that has negative refracting power and is in a meniscus form having a convex surface on an object side thereof, a fourth lens L4 that has negative refracting power and a concave surface on an object side thereof, a fifth lens L5 having positive refracting power, a negative lens located on an image side of the zoom lens with respect to said fifth lens L5, and wherein the zoom lens satisfies condition (3) upon focusing on an infinite object point at the wide-angle end:

$$0 \leq |d4/d1| \leq 3 \qquad (3)$$

where d1 is a space between said first lens L1 and said second lens L2, and d4 is a space between said fourth lens L4 and said fifth lens L5.

15. A zoom lens, comprising, in order from an object side to an image side thereof, a lens group having negative refracting power, and a lens group having positive refracting power, wherein:

zooming is carried out with a change in a space between at least said two lens groups, and said lens group having negative refracting power comprises, in order from an object side thereof, a first lens L1 that has negative refracting power and is in a meniscus form having a convex surface on an object side thereof, a second lens L2 that is in a meniscus form having a convex surface on an object side thereof, a third lens L3 that has negative refracting power and is in a meniscus form having a convex surface on an object side thereof, a fourth lens L4 that has negative refracting power and a concave surface on an object side thereof, a fifth lens L5 having positive refracting power, and a negative lens located on an image side of the zoom lens with respect to said fifth lens L5, wherein at least one negative lens in said lens group having negative refracting power, and at least one positive lens in said lens group having positive refracting power is each formed of a glass material that satisfies condition (4):

$$\theta_{g,F} \leq -0.0016 \times v_d + 0.65 \qquad (4)$$

where $\theta_{g,F} = (n_g - n_F)/(n_F - n_c)$, $v_d = (n_d - 1)/(n_{f-nc})$, $n_g$ gis a g-line refractive index, $n_F$ is an F-line refractive index, $n_d$ is a d-line refractive index, and $n_C$ is a C-line refractive index.

* * * * *

UNITED STATES PATENT AND TRADEMARK OFFICE
CERTIFICATE OF CORRECTION

PATENT NO. : 7,280,284 B2
APPLICATION NO. : 11/219781
DATED : October 9, 2007
INVENTOR(S) : Atsujiro Ishii It is certified that error appears in the above-identified patent and that said Letters Patent is hereby corrected as shown below:

Column 13, line 62, change "$2.05 \leq |f2A/f_1 \leq 3.5$ (2)" to --$2.05 \leq |f_{2A}/f_1| \leq 3.5$ (2)    (2)--;

Column 14, line 6, change "$\chi$" to --x--;

Column 14, line 8, change "θg,F" to --$\theta_{g,F}$--;

Column 14, line 9, change " $v_d = (n_d - 1 / (n_{F-nc}),$ " to --$v_d = (n_d - 1) / (n_F - n_c)$,--;

Column 16, line 59, change "θg,F-" to --θg,F =--;

Column 16, line 60, change "$v_d = (n_d - 1 / (n_{f-nc}),$" to --$v_d = (n_d - 1 / (n_f \sim n_c),$--; and Column 16, line 61, change "$n_g$ gis a g-line" to --$n_g$ is a g-line--.

Signed and Sealed this

Eighth Day of July, 2008

JON W. DUDAS
*Director of the United States Patent and Trademark Office*